G. W. FENSTEMAKER.
NUT LOCK.
APPLICATION FILED JUNE 20, 1913.
1,136,416.
Patented Apr. 20, 1915.
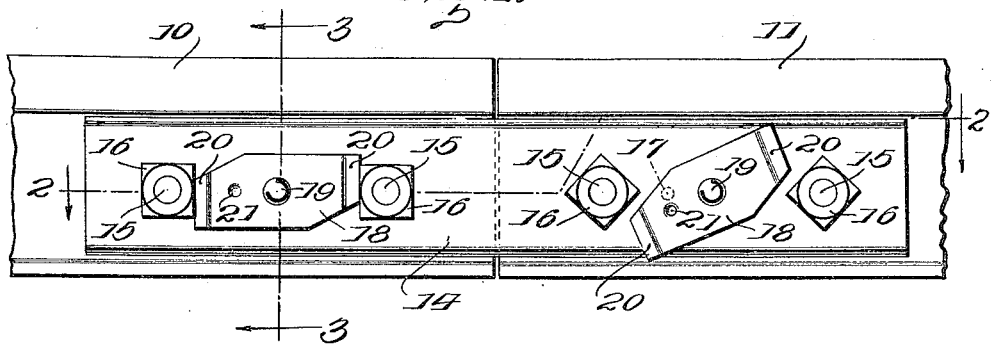
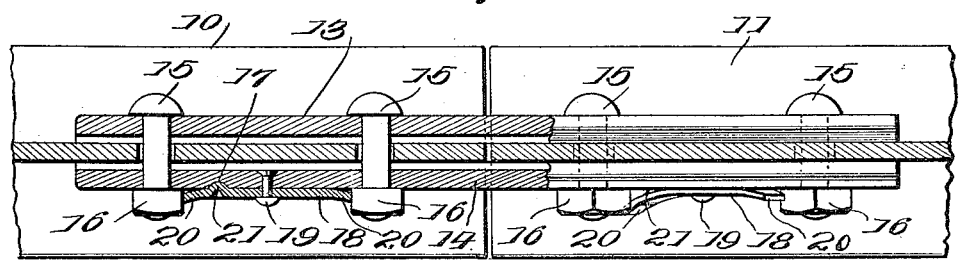
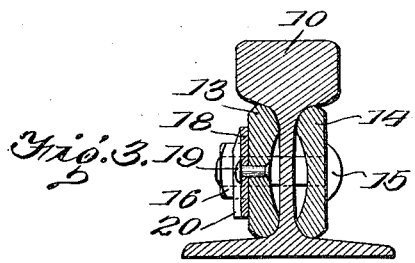
Inventor
G. W. Fenstemaker

UNITED STATES PATENT OFFICE.

GEORGE W. FENSTEMAKER, OF AMBOY, ILLINOIS, ASSIGNOR OF ONE-HALF TO PETER O'CONNOR, OF AMBOY, ILLINOIS.

NUT-LOCK.

1,136,416. Specification of Letters Patent. Patented Apr. 20, 1915.

Application filed June 20, 1913. Serial No. 774,881.

*To all whom it may concern:*

Be it known that I, GEORGE W. FENSTEMAKER, citizen of the United States, residing at Amboy, in the county of Lee and State of Illinois, have invented certain new and useful Improvements in Nut-Locks, of which the following is a specification.

This invention relates to improvements in nut locks, more particularly to nut locks employed upon the clamp bolts of railway rail joints, and has for one of its objects to simplify and improve the construction and increase the efficiency and utility of devices of this character.

Another object of the invention is to provide a simply constructed device in which no change is required in the bolt or the nut, and which does not weaken or disfigure the nut or the bolt, and which may be readily applied without material structural change to nuts and bolts of various forms and sizes.

With these and other objects in view the invention consists in certain novel features of construction as hereinafter shown and described and then specifically pointed out in the claim.

The improved device may be employed upon any form of nut or bolt, or to nuts or bolts employed for any purpose, and is not designed therefore to limit the invention in any manner in this respect, but for the purpose of illustration the improved device is shown applied to clamp nuts and bolts of a conventional railway rail joint to which the device is more particularly applicable; and in the drawings thus employed and for the purpose of illustrating the embodiment of the invention Figure 1 represents a conventional railway joint in side elevation with the improvement applied. Fig. 2 is a plan view with the rail in section on the line 2—2 of Fig. 1. Fig. 3 is a transverse section on the line 3—3 of Fig. 1.

Corresponding and like parts are referred to in the following description and indicated in all the views of the drawings by the same reference characters.

In the drawings the rails are represented conventionally at 10—11, the clamp or fish plates at 13—14, the clamp bolts at 15, and the clamp nuts at 16, these parts being of the usual construction, except that the fish plate upon which the nuts bear, for instance the plate 14, is provided with slight indentations or depressions 17, the object to be hereafter explained.

The rails, fish plates, and clamp devices are of the usual construction, and no change is required in these parts, except, as above stated the slight depressions 17 in one of the fish plates.

The nut holding attachment comprises a plate 18 pivoted at 19 upon the fish plate which contains the indentation 17, the pivot being located midway between each pair of the bolts 15 and the nuts 16. The plate 18 is reduced in width at the ends with the reduced terminals extending normally at an angle oblique to the longitudinal plane of the plate and adapted to bear against the confronting faces of the adjacent nuts 16 as represented at the left in Fig. 1, and with the ends slightly out-turned as represented at 20. Each of the plates 18 is likewise provided with a protuberance 21 adapted to engage in the adjacent depression 17 of the fish plate when the locking plate is disposed for engagement with the nuts as represented at the left in Fig. 1. By this means the plate 19 is firmly anchored in position in contact with the nut. The plate 18 is formed of resilient material, preferably steel, and the rivet 19 holds the body portion of the plate 18 firmly against the fish plate to which it is attached with the proturberance 21 within the depression 17. By this means the resiliency of the plate 18 will permit the protuberance 21 to be disengaged from the recess 17 by a sufficient force applied to one edge of the plate, to force the latter into the position shown at the right of Fig. 1 and thus release the nuts which may be rotated as required either to set them against the fish plate or to release them from the bolt.

In applying the device the plates 18 are set into the position shown at the right of Fig. 1, or released from the nuts, and after the latter have been turned home by the wrench or other implement the plates 18 are forced into locking position as shown at the left of Figs. 1 and 2 and the protuberance 21 caused to engage in the adjacent depression 17. By this means the nuts are firmly locked in position and can be released only by a considerable degree of force applied to the plate 18.

The improved device is simple in construction, can be inexpensively applied, and operates effectually for the purposes as described.

Having thus described the invention, what is claimed as new is:

In a nut lock, a bearing member having a depression and apertured to receive clamp bolts, said member being adapted to be disposed beneath the nuts upon the bolts, and a member of resilient material pivoted upon said bearing member with its terminals extending obliquely to the longitudinal axis thereof and adapted to bear squarely against the nuts intermediate the contiguous sides of said nuts, said resilient member having a protuberance formed thereon at the inner extremity of one of said obliquely directed terminals, said protuberance being arranged for engagement within the depression of the bearing member, the adjacent obliquely directed terminal of the resilient member coacting with the nut engaged thereby, in the operative position of said resilient member, to hold the protuberance in engagement within the depression.

In testimony whereof I affix my signature in presence of two witnesses.

GEORGE W. FENSTEMAKER. [L. S.]

Witnesses:
WILLIAM L. LEECH,
PETER O'CONNOR.

Copies of this patent may be obtained for five cents each, by addressing the "Commissioner of Patents, Washington, D. C."